(12) United States Patent
Moss et al.

(10) Patent No.: US 7,260,923 B2
(45) Date of Patent: Aug. 28, 2007

(54) METHOD AND APPARATUS FOR FILTERING AIR ENTERING AN ANIMAL'S NOSTRILS

(76) Inventors: Ann Moss, 421 N. Beverly Dr. #260, Beverly Hills, CA (US) 90210; John Shirreffs, 532 Valido Rd., Arcadia, CA (US) 91007

( * ) Notice: Subject to any disclaimer, the term of this patent is extended or adjusted under 35 U.S.C. 154(b) by 0 days.

(21) Appl. No.: 10/910,563

(22) Filed: Aug. 3, 2004

(65) Prior Publication Data

US 2006/0032196 A1  Feb. 16, 2006

(51) Int. Cl.
*B68C 5/00* (2006.01)
(52) U.S. Cl. .............................................. 54/80.3
(58) Field of Classification Search ............. 54/80.3, 54/80.5, 803; 119/821, 831, 832, 834; D30/152, D30/144; D24/110.1; 2/9
See application file for complete search history.

(56) References Cited

U.S. PATENT DOCUMENTS

| 381,285 | A | * | 4/1888 | Shue ........................... 54/80.3 |
| 1,297,842 | A | * | 3/1919 | Harllee ....................... 119/832 |
| 1,311,933 | A | * | 8/1919 | Weigel ........................ 54/80.3 |
| 3,609,941 | A | * | 10/1971 | Eldredge ..................... 54/80.3 |
| 4,002,167 | A | | 1/1977 | Rambosek |
| 4,044,531 | A | * | 8/1977 | Marchello et al. ........... 54/80.3 |
| 4,141,199 | A | | 2/1979 | Doino, Jr. |
| 4,273,119 | A | | 6/1981 | Marchello |
| 4,519,187 | A | * | 5/1985 | Reynolds ..................... 54/80.3 |
| 4,600,002 | A | | 7/1986 | Maryyanek et al. |
| D285,374 | S | | 8/1986 | Huber et al. |
| 4,643,182 | A | * | 2/1987 | Klein ..................... 128/201.25 |
| 4,726,174 | A | | 2/1988 | Wilson |
| 4,850,347 | A | | 7/1989 | Skov |
| 5,249,570 | A | | 10/1993 | Cox |
| 5,954,049 | A | | 9/1999 | Foley et al. |
| 6,095,143 | A | * | 8/2000 | Dyrud et al. ..................... 2/9 |
| 2004/0231023 | A1 | * | 11/2004 | Huang .............................. 2/9 |

OTHER PUBLICATIONS

Moldex-Metric, Inc., 2200 Series N95 Particulate Respirators, Internet website page at http://www.moldex.com/disposableprod/2200n95.htm, accessed Aug. 3, 2004, p. 1, Moldex-Metric, Inc., accessed on Internet at Los Angeles, California, USA.

Moldex-Metric, Inc., 2200N Series N95 Particulate Respirators, Internet website page at http://www.moldex.com/pdfs/datasheets/2200n95.pdf, accessed Aug. 3, 2004, pp. 1-2, Moldex-Metric, Inc., accessed on Internet at Los Angeles, California, USA.

* cited by examiner

*Primary Examiner*—Thomas Price
(74) *Attorney, Agent, or Firm*—Orrick, Herrington & Sutcliffe, LLP

(57) ABSTRACT

A method and apparatus for filter air entering an animal's nostrils include a filtering element operatively disposed with a lower portion contacting the animal's nose region between the animal's nostrils and upper lip. A nose mask may be secured against the animal's nose region with adhesive or one or more stretchable bands extending around a portion of the head of the animal.

21 Claims, 6 Drawing Sheets

METHOD AND APPARATUS FOR FILTERING AIR ENTERING AN ANIMAL'S NOSTRILS

FIELD OF THE INVENTION

This invention relates to air filtration, more particularly filtering air entering the nostrils of an animal.

BACKGROUND

Horses and other animals are sometimes located in environments having airborne particulate matter, such as stables, training areas, or race tracks. The airways of horses or other animals may be irritated or inflamed, or the breathing function impeded, by the inhalation of particulate matter, such as dust, dirt, pollens, grains, grasses, or hay particles. Inhalation of these materials, particularly hay and some processed grains, may lead to allergic reactions or the respiratory condition known as "heaves," which is also known as recurrent airway obstruction. Believed to be primarily caused by chronic exposure to dusts and molds in hay and other materials, heaves can greatly impair the function of a horse's lungs, making it difficult for the horse to breathe at rest, and even more so during physical exertion. Similar to human asthma, heaves may cause the muscles inside the airways to constrict in response to external stimuli such as dust, pollen, or mold.

Horses typically breathe primarily through the nose. When feeding on hay, grains, oats or other dry materials, a horse may be susceptible to inhaling the feed or other particulate matter into the nostril, particularly if the horse inhales air through its nose while its nose is positioned near the feed. The feed may also tend to collect on the horse's nose during feeding, particularly on any moist regions of the nose. Moreover, particles such as dust, dirt or dander may be released into the air while a horse is being cleaned.

Various types of masks have been developed for use with horses to perform various functions. Fly masks have been designed to protect the sensitive areas of a horse's head from flies or gnats. Pre-warmer masks have been developed for cold-weather horse racing to warm the air entering a horse's nasal cavity and lungs. Other masks for use with horses have been designed to administer medication, such as bronchodilators or Corticosteroids, by inhalation.

Previous masks, however, do not filter air entering the nostrils, or cover the nose and mouth, and thus are not useful during feeding, when the susceptibility to inhaling hay and grain particles may be heightened.

SUMMARY OF THE INVENTION

In a first separate aspect of an embodiment of the invention, a nose mask for an animal comprises a flexible, air-permeable filter element that is operatively adaptable to fit a nose region of an animal and to generally correspond to the contours of the nose region, and a lower portion of the nose mask contacts an area between the animal's mouth and nostrils.

In a second separate aspect of an embodiment of the invention, a nose mask filters from entering an animal's nostrils various particles that might irritate the animal's airway or impede breathing, and does not block the mouth, minimizing interference with normal feeding.

In a third separate aspect of an embodiment of the invention, a nose mask for an animal is adaptable to generally fit the contours of an animal's nose region, inhibiting air flow between the mask and the animal's head.

In a fourth separate aspect of an embodiment of the invention, a nose mask for an animal is conveniently secured to or removed from an animal using a securing member that is stretched around an animal's lower jaw to hold the filter element against the animal's nose region, the securing member being sufficiently stretchable that the animal may open its mouth with the mask in place on the nose region, minimizing interference with normal feeding.

In a fifth separate aspect of an embodiment of the invention, a nose mask for an animal is secured to an animal with an adhesive that contacts the animal's nose region and secures a filter element against the nose region.

In a sixth separate aspect of an embodiment of the invention, a nose mask for an animal provides clearance between a filter element and an animal's nostrils.

The various aspects of the invention may be present independently or in combination in one or more embodiments of the invention.

DESCRIPTION OF THE PREFERRED EMBODIMENTS

Figure 1:
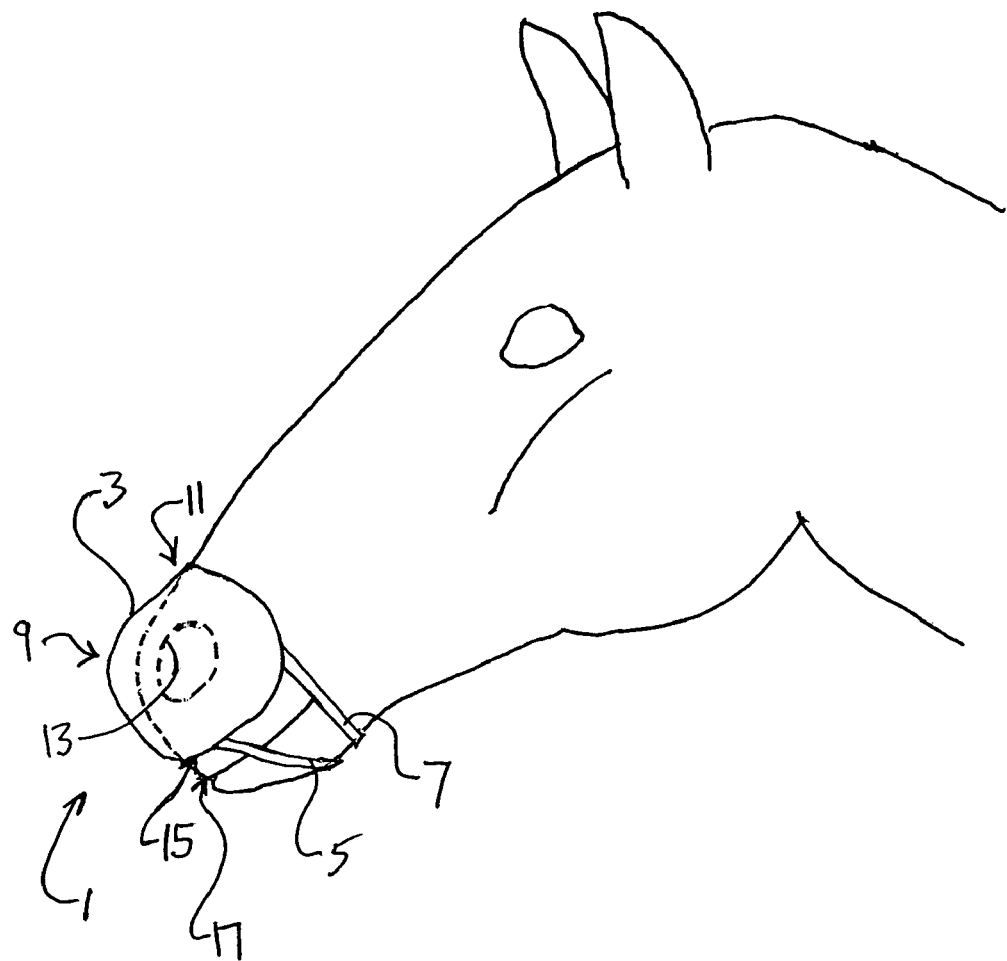
FIG. 1 is a side view of an embodiment of a nose mask operatively disposed about the nose region of a horse.
Figure 2:
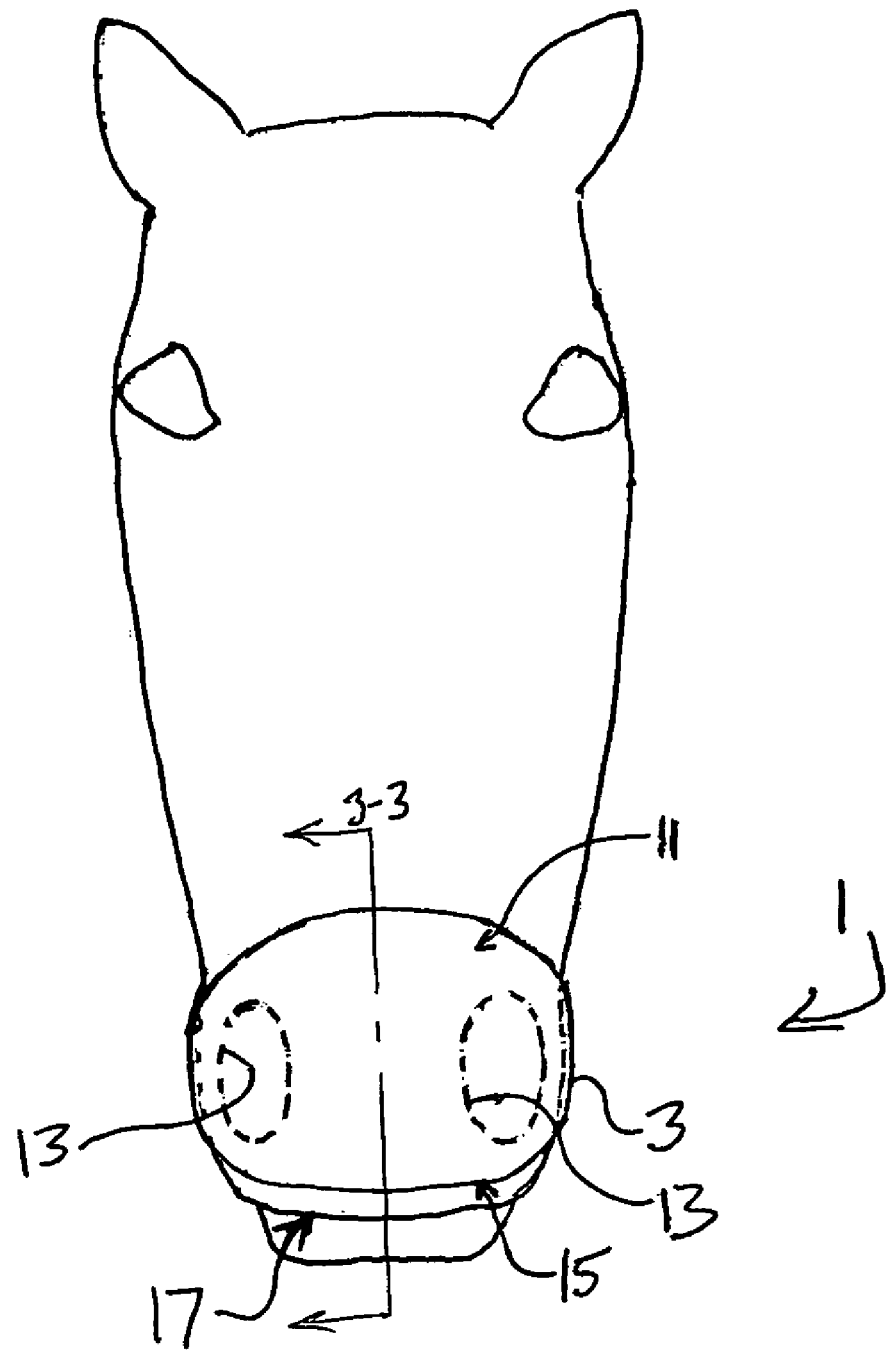
FIG. 2 is a front view of the nose mask of FIG. 1.
Figure 3:
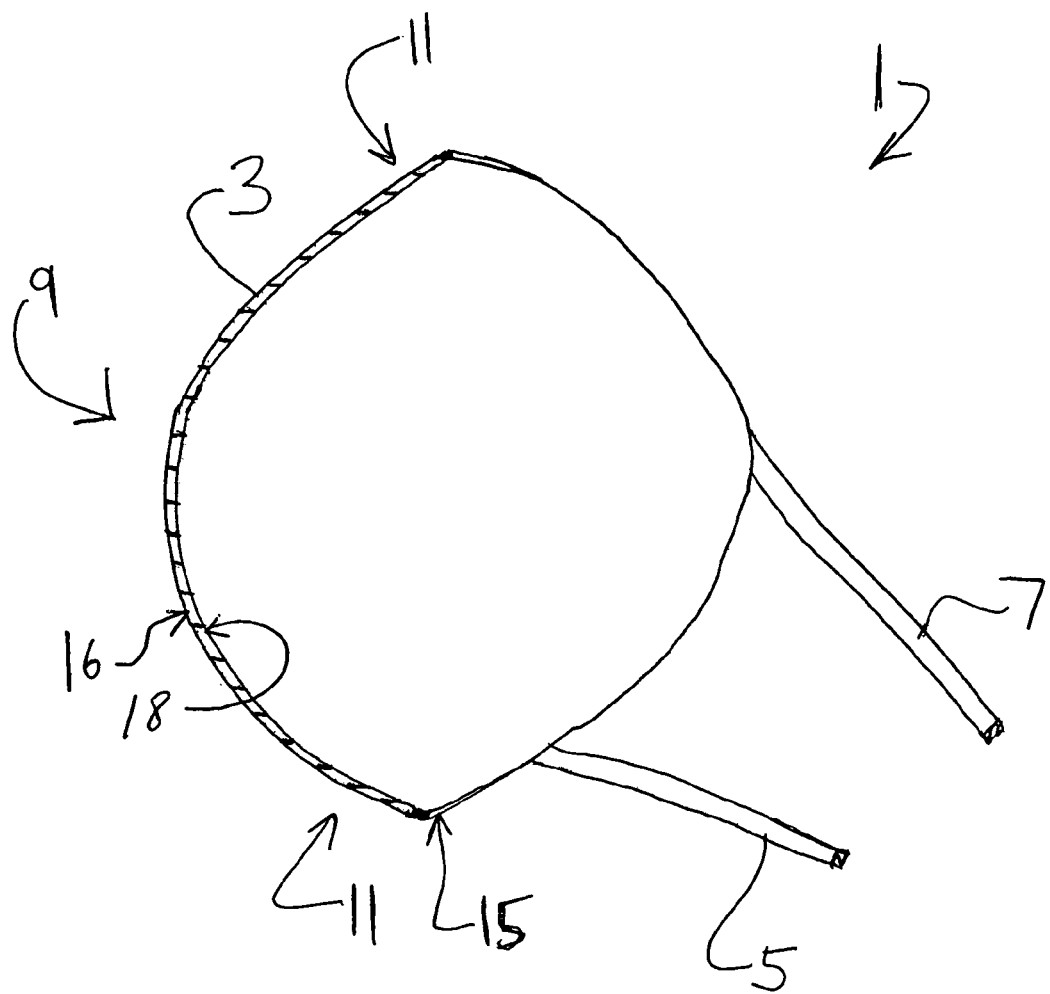
FIG. 3 is a cross section of the nose mask of FIGS. 1 and 2, viewed from the direction indicated by the line labeled 3-3 in FIG. 2.

FIGS. 1, 2 and 3 illustrate a preferred embodiment of a nose mask 1 for an animal. Though the nose mask may be used with other animals, an exemplary application is with respect to horses as shown.

The nose mask 1 of FIGS. 1, 2 and 3 has a flexible, air-permeable filter element 3, a first securing member 5, and a second securing member 7.

The filter element 3 has a central region 9 surrounded by a peripheral region 11 disposed along the edge of the filter element. The filter element 3 has a shape that allows the filter element to fit over a horse's nostrils 13 (indicated by dotted lines), and has a peripheral region 11 with a shape that generally corresponds to the contours of a horse's nose region, i.e., a region of the muzzle surrounding the nostrils 13. The filter element 3 preferably tends to retain the form in which it is manufactured, but is flexible to be shaped to substantially conform to the contours of a horse's nose region.

When operatively disposed on a horse, the peripheral region 11 of the filter element 3 contacts a horse's nose region, with a lower portion of the peripheral region 11 having a lower edge 15 contacting the nose region between a horse's upper lip 17 and nostrils 13. The filter element 3 is positioned away from the mouth, minimizing interference with normal feeding.

Gaps between the filter element 3 and the horse's nose region are minimized to minimize air flow between the mask 1 and nose region. Preferably, there is substantially continuous contact between the peripheral region 11 and the horse's nose region so that air flows through the filter element 3 rather than between the mask 1 and the horse's nose region.

Viewed from above, such as in FIG. 2, the edge of the filter element 3 preferably is curvilinear, and may be in the general shape of an oval or circle. The edge of the filter element 3 generally follows the contours of the animal's nose region when operatively disposed.

Figure 5:
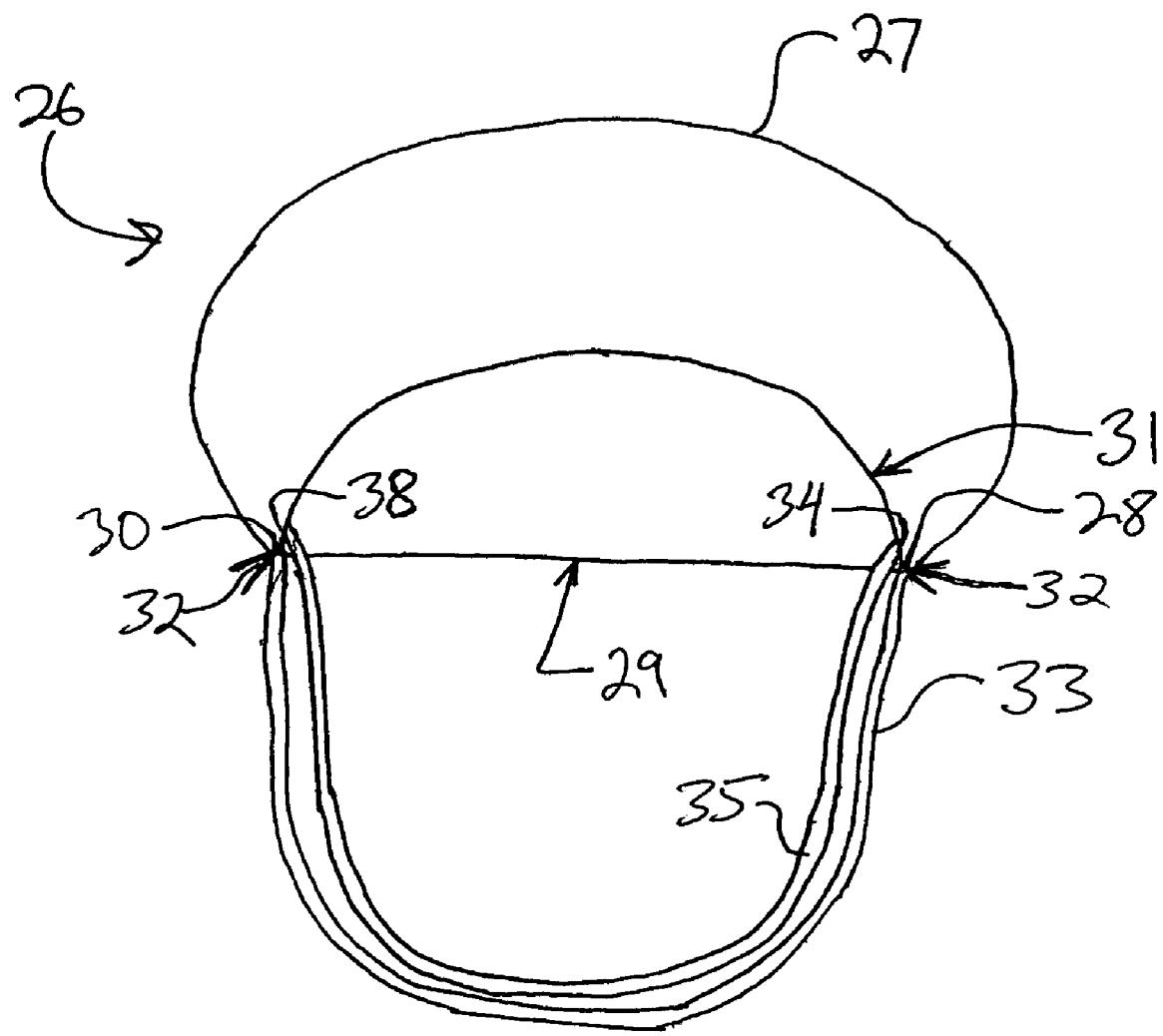
FIG. 5 is a side view of another embodiment of a nose mask, viewed, when operatively disposed, from the direction indicated by the line labeled 5-5 in FIG. 4.

As shown in FIG. 5, a lower edge 29 and an upper edge 31 of a filter element 27 of an embodiment of a nose mask 26 having a first securing member 33 and a second securing member 35 may lie out of plane. For example, as shown in FIG. 5, the upper edge 31 may be arcuate viewed from a side, and arch upwardly away from side edges 32 of the filter element 27, to facilitate correspondence of the filter element 27 with the contours of the animal's nose region. The lower edge 29 or side edges 32, or both, also may be arcuate or otherwise curvilinear viewed from a side.

Figure 6:
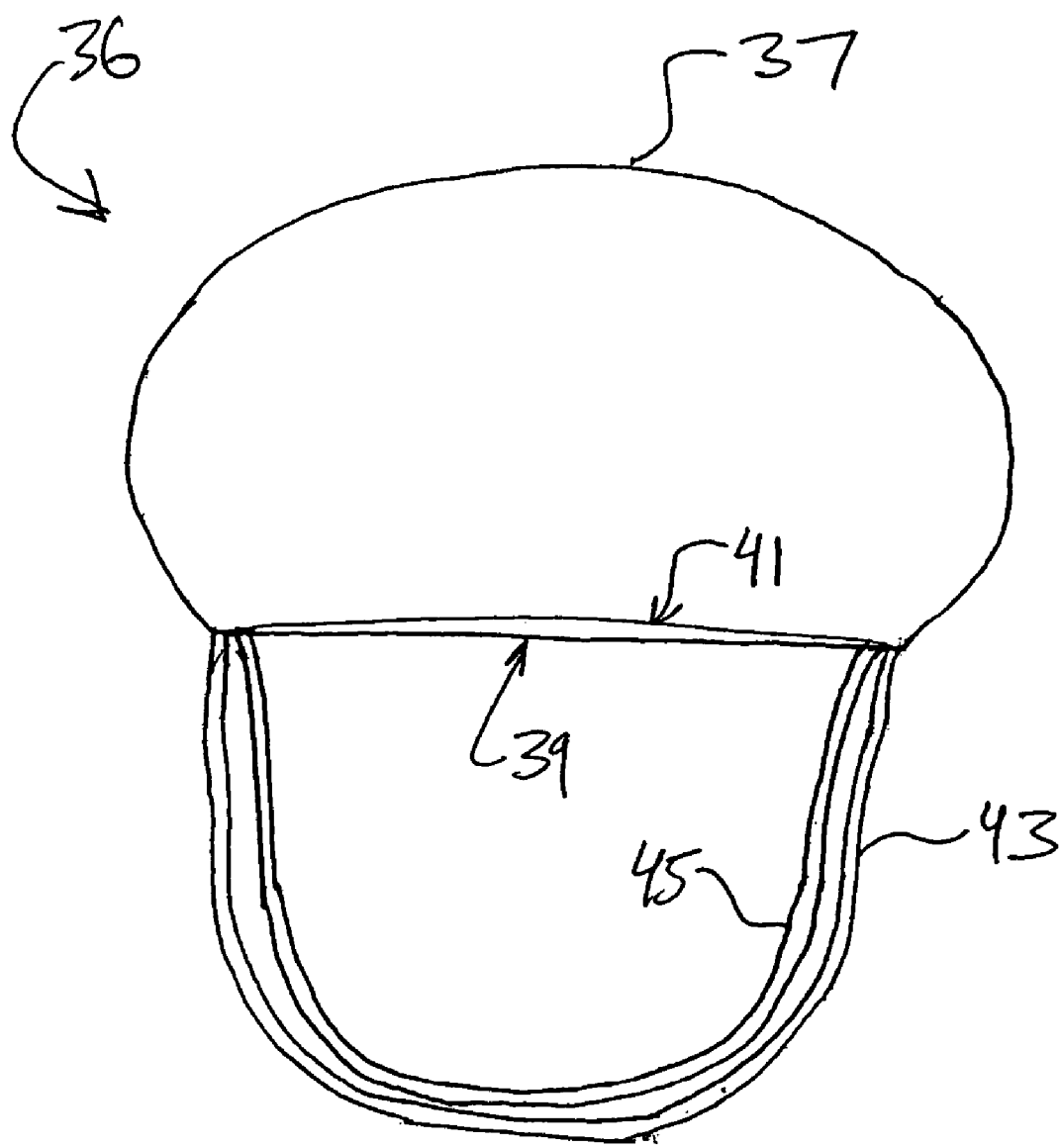
FIG. 6 is a side view of yet another embodiment of a nose mask, viewed, when operatively disposed, from the direction indicated by the line labeled 5-5 in FIG. 4.

Alternately, as shown in FIG. 6, a lower edge 39 and an upper edge 41 of the filter element 37 of an embodiment of a nose mask 36 having a first securing member 43 and a second securing member 45 may lie substantially in a single plane.

Returning to FIGS. 1, 2 and 3, the central region 9 of the filter element 3 preferably is spaced apart from and does not contact the nostrils 13. The central region 9 preferably has a convex outer surface 16 that arches from the nostrils 13 to provide clearance between the central region 9 and the nostrils 13 when the mask 1 is operatively disposed in contact with a horse's nose region. Alternately, the central region may have a form that is not convex, but provides clearance between the central region and the nostrils.

Preferably, the filter element 3 is shaped to provide approximately one inch of clearance between an inner surface 18 of the filter element 3 and the nostrils 13, as may be measured perpendicularly to each nostril 13, or measured along the axis of each nostril 13 passage. Alternately, the central region of the filter element may contact the horse's nose region without providing clearance between the central region and the nostrils.

In order to form the filter element into the a shape that generally corresponds to the contours of an animal's nose region, the filter element may be formed in separate segments which are appropriately stitched or sealed together to form the desired shape.

A filter element may be made from or include a filtering material that may be made from or include one or more of various types of commercially available filter material used for filtering various airborne particles, such as non-woven polyester fiber, electrostatically charged polypropylene, activated charcoal, various types of natural fibers, foam, mesh, or a material that is gas-absorbing, webbed, or porous, or that has an open-cell structure. A filter element may be made from or include one or more materials, and may have multiple layers of materials, such as the materials or layers disclosed in U.S. Pat. No. 4,850,347. Preferably, a filter element may be made from materials like the materials used in "N95" particulate respirators sold by Moldex Metric, Inc. of Culver City, Calif. under the designation "2200N Series."

As shown in FIG. 5, a first securing member 33 is connected with and extends between a first attachment point 28 and a second attachment point 30 located at spaced-apart locations in the peripheral region of the filter element 27. A second securing member 35 is connected with and extends between a third attachment point 34 and a fourth attachment point 38 located at spaced-apart locations in the peripheral region of the filter element 27.

Each securing member is preferably made of a stretchable material that tends to return toward its original shape. Each securing member preferably is formed in the shape of a band or string, and is releasably securable to the animal's head to secure the filter element against the nose region.

To secure the mask to a horse's head as shown in FIG. 1, the filter element 3 is placed on the horse's nose region with a lower edge 15 of the filter element 3 positioned between a horse's upper lip 17 and nostrils 13, and the first securing member 5 and second securing member 7 are preferably extended around the horse's lower jaw.

Figure 4:
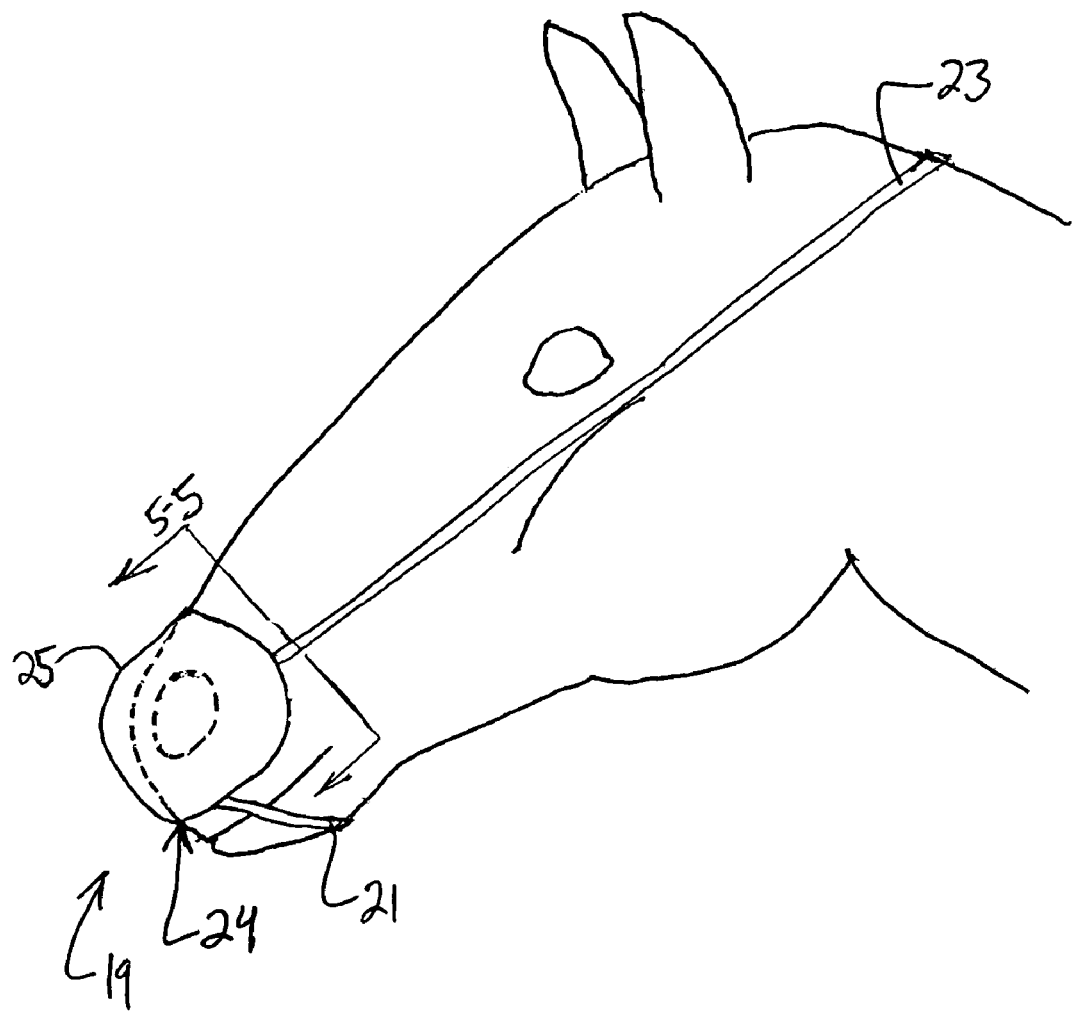
FIG. 4 is another embodiment of a nose mask having a second securing member passing around the head of a horse behind the ears.

Alternately, as shown for the embodiment of a nose mask 19 shown in FIG. 4, the filter element 25 is placed on the horse's nose region with a lower edge 24 of the filter element 25 positioned between a horse's upper lip and nostrils, and a first securing member 21 may be extended around the horse's lower jaw. The second securing member 23 preferably is extended around the horse's head behind the ears, or in the poll area. If the horse is wearing a halter, the second securing member may connected with the halter, such as by being extended around the halter or a halter ring, or tied or otherwise secured to the halter or halter ring.

When operatively extended, each securing member is in tension and helps secure the filter element against the horse's nose region. A securing member may be released by stretching the securing member and removing it from tensioned contact with the horse. A securing member may be made of rubber or other stretchable material, and may be attached to the filter element with adhesive, by stapling or stitching, or by other conventional means. Alternately, the filter element may be provided with a passage at each attachment point, and a securing member may be inserted through the passage, and secured to the filter element such as by tying a knot.

As an alternative to, or in conjunction with, securing members, an adhesive, such as glue or tape may be disposed along at least a portion of the peripheral region of the filter element, preferably near the edge of the filter element, and placed in contact with the horse's nose region to releasably secure the filter element to the horse. To minimize air flow between the filter element and the horse's nose region, the adhesive preferably is disposed substantially continuously along the entire length of the peripheral region of the filter element. The mask may be released by lifting or peeling the filter element away from the horse's nose region.

Preferably, the filter element remains in a form substantially conforming to the contours of a horse's nose region under tension of one or more securing members, or by adhesion to a horse's nose region.

Many changes, modifications, variations, and other uses and applications of the subject invention will, however, become apparent to those skilled in the art after considering this specification together with the accompanying drawings and claims. All such changes, modifications, variations, and other uses of the applications which do not depart from the spirit and scope of the invention are deemed to be covered by the invention, which is limited only by the claims which follow.

What is claimed is:

1. A nose mask for covering the nostrils but not the mouth of an animal, said nose mask comprising:
a filter element having a central region surrounded by a peripheral region, said filter element being formed from a flexible, air-permeable material which can be shaped during use of said filter element and configured to fit the nose region of the animal such that said central region of said filter element is spaced apart from and does not contact the animal's nostrils while said peripheral region of said filter element generally corresponds to the contours of the animal's nose region and a lower portion of said peripheral region contacts the nose region in a location between the animal's mouth and nostrils, said filter element further including an adhesive material disposed along at least a portion of said peripheral region to releasably secure said filter element to the animal.

2. A nose mask according to claim 1, an edge of said filter element being curvilinear.

3. A nose mask according to claim 2, an upper edge of said filter element being arched upwardly away from side edges of said filter element.

4. A nose mask according to claim 1, said central region of said filter element having an outer surface that is at least partially convex and arches from said peripheral region of said filter element, providing clearance between said central region and the animal's nostrils when said nose mask is in use.

5. A nose mask according to claim 4, the said central region of said filter element being spaced approximately one inch apart from the animal's nostrils.

6. A nose mask according to claim 1, said flexible, air-permeable material being selected from a group including a non-woven polyester fiber, an electrostatically charged polypropylene, activated charcoal, natural fibers, a foam, a mesh, a gas-absorbing material, a webbed material, a porous material, or a material having an open-cell structure.

7. A nose mask according to claim 1, further comprising:
a first securing member connected with and extending between a first attachment point and a second attachment point and releasably securable to the animal's head to secure said filter element against the animal's nose region, said first and second attachment points being spaced apart on said peripheral region of said filter element; and
a second securing member connected with and extending between a third attachment point and a fourth attachment point and releasably securable to the animal's head to secure said filter element against the animal's nose region, said second and third attachment points being spaced apart on said peripheral region of said filter element.

8. A nose mask according to claim 7, each of said first and second securing members including a band of stretchable material.

9. A nose mask according to claim 7, said first securing member being operatively disposed to extend away from the animal's nose region and pass around the animal's lower jaw.

10. A nose mask according to claim 7, said second securing member being operatively disposed to extend around the animal's head near the animal's ears.

11. A nose mask according to claim 7, said second securing member being operatively disposed to be secured to a halter.

12. A method for filtering air entering an animal's nostrils, comprising the steps of:
providing a nose mask for covering the nostrils but not the mouth of the animal, said nose mask including a filter element having a central region surrounded by a peripheral region, said filter element being formed from a flexible, air-permeable material which can be shaped during use of said filter element and configured to fit a nose region of the animal such that said central region of said filter element is spaced apart from and does not contact the animal's nostrils while said peripheral region of said filter element generally corresponds to the contours of the animal's nose region;
disposing said nose mask over the animal's nose region such that a lower portion of said peripheral region of said filter element contacts the nose region in a location between the animal's nostrils and mouth; and
releasably securing said filter element against the animal's nose region by including an adhesive material disposed along at least a portion of said peripheral region of said filter element, and contacting said adhesive material with the animal's nose region.

13. The method according to claim 12, said step of releasably securing said filter element against the animal's nose region including:
extending a first securing member around the animal's lower jaw, said first securing member being connected with and extending between a first attachment point and a second attachment point, said first and second attachment points being spaced apart on said peripheral region of said filter element; and
extending a second securing member around the animal's head, said second securing member being connected with and extending between a third attachment point and a fourth attachment point, said third and fourth attachment points being spaced apart on said peripheral region of said filter element.

14. The method according to claim 13, said step of extending said second securing member including extending said second securing member around the animal's head near the animal's ears.

15. The method according to claim 13, said step of securing said second securing member including securing said second securing member to a halter.

16. An equine nose mask for protecting the nostrils of a horse from particulates and contaminants, the equine nose mask comprising:
a filter structure containing non-woven, flexible air-permeable elastic material,
said filter structure including a first portion configurable to fit over the horse's nostrils without covering the mouth of the horse, said first portion having a central region with a shape which can be configured to fit to the horse's nostril area during use of said eguine nose mask such that said central region of said first portion is spaced apart from and does not contact the horse's nostrils, said first portion also having peripheral region with an edge which extends along and is releasably secured to an area part way between the horse's nostrils and the horse's upper lip, leaving the horse's muzzle free when the equine nose mask is placed on the horse,
said filter structure also including a second portion which extends around the horse's lower jaw in an area removed from the horse's muzzle to assist in holding said first portion of said filter structure over the horse's nostrils without blocking the horse's mouth, thereby creating a filtering screen which prevents particulates and other contaminants from entering the horse's nostrils when the equine nose mask is placed on the horse, said second portion being sufficiently stretchable to permit the horse to open its mouth when the equine nose mask is placed on the horse, thereby minimizing interference with the horse's feeding.

17. An equine breathing mask as set forth in claim 16, wherein said first portion of said filter structure further includes a securing member opposite said edge of said first portion, said securing member having a configuration adapted for attachment to a halter worn by the horse.

18. An equine breathing mask as set forth in claim 17, wherein said securing member opposite said edge of said first portion of said filter structure is formed as a strap.

19. An equine breathing mask as set forth in claim 16, wherein said second portion of said filter structure includes a securing member configured to extend around the lower jaw of the horse.

20. An equine breathing mask as set forth in claim 19, wherein said securing member configured to extend around the lower jaw of the horse is formed as a strap.

21. An equine breathing mask as set forth in claim 16, wherein said shape of said central region of said first portion of said filter structure conforms to the horse's nostril area such that part of said central region is in substantiaUy continuous contact with the area surrounding the horse's nostrils, enabling air to flow through said filter structure into the horse's nostrils rather than in between said filter structure and the horse's nostril area.

* * * * *